GRAPHIC SCANNING SYSTEM

Filed Oct. 18, 1965 2 Sheets-Sheet 1

INVENTOR
WILLIAM H. SASS

BY [signature]

ATTORNEY

April 7, 1970 W. H. SASS 3,505,509

GRAPHIC SCANNING SYSTEM

Filed Oct. 18, 1965 2 Sheets-Sheet 2

United States Patent Office 3,505,509
Patented Apr. 7, 1970

3,505,509

GRAPHIC SCANNING SYSTEM

William H. Sass, Ulster Park, N.Y., assignor to International Business Machines Corporation, Armonk, N.Y., a corporation of New York Filed Oct. 18, 1965, Ser. No. 497,153
Int. Cl. G06f 5/00
U.S. Cl. 235—154 7 Claims

ABSTRACT OF THE DISCLOSURE

A graphic scanning system causes the spot of a flying spot scanner to trace a line from an attained position, in increments, in response to a single order specifying the length and direction of a single increment and the number of increments to be executed. A photodetector for examining an image scanned by the spot gates coordinate information defining an increment when the gamma of the image lies on a preselected side of a threshold value.

Figure 1:
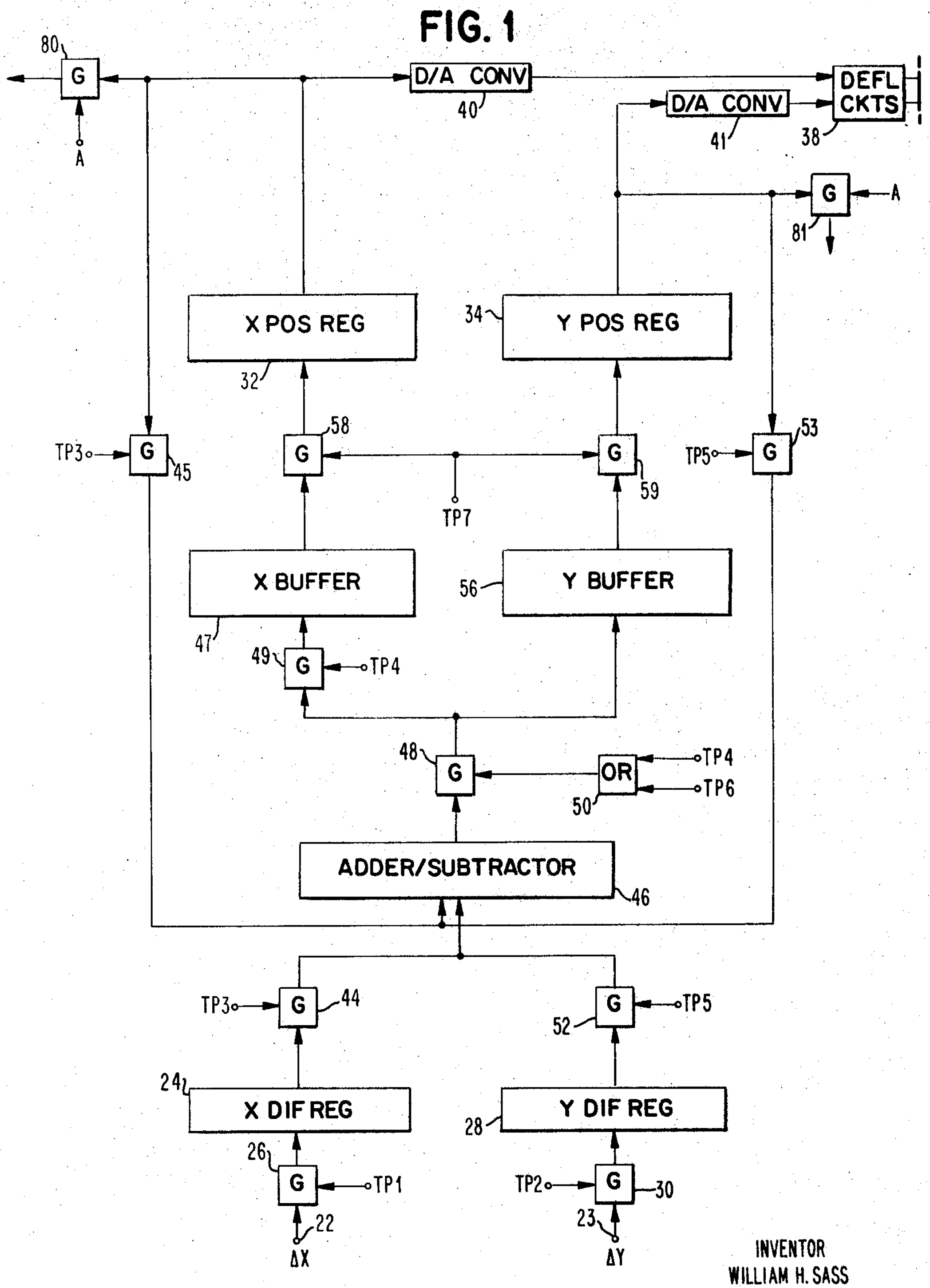

This invention relates to graphic scanning systems and more particularly to flying spot scanning systems for digitizing analog graphic data.

Computer controlled graphic display systems utilizing cathode ray display tubes have been developed and are being used at an ever increasing rate. In order to realize their full potential it is necessary that analog graphic data be reduced to digital data for storage and computation. The reduction of analog graphic data to digital data has proved to be, however, a real problem area in digital computer controlled graphic display systems.

Where complex intricate images are to be reduced to digital data for storage or computation, the lack of storage facilities has imposed a severe limitation on system capability. In order to accurately scan an intricate image the computer generating the scan must store a tremendous quantity of data to generate a large number of scanning lines with which to examine the image to be reduced. The large number of small scanning lines is essential to match the fine resolution of an intricate image without loss of detail. Furthermore, the use of many short scanning lines requires additional storage capacity to retain data concerning the image.

An obvious solution to this problem is to increase storage capacity. Such a solution, however, is not acceptable in most instances since it renders use of such equipment uneconomical.

The storage problem in scanning is two fold since high resolution of the image requires many short scanning lines. Each of these lines to be generated must be defined in storage. To minimize this storage problem longer scanning lines could be employed, however, the location or definition of the image would not be as precise. The other aspect of the storage problem arises in the storage of the data defining the image. Here, for each scanning line, data is available and this data requires storage in order that the image be faithfully reproduced.

One object of this invention is to reduce the data storage requirements of a digital computer controlled graphic display system.

Another object of the invention is to increase the resolution of a digital computer controlled graphic display system without a corresponding increase in data storage requirements.

A further object of the invention is to provide a graphic scanning system in which the image is precisely defined with a reduced quantity of digital data.

Yet another object of the invention is to provide a novel scanning system for use with a digital computer controlled graphic display system which provides high resolution with low data storage requirements.

A further object of the invention is to provide a scanning system for use with digital computer controlled graphic display systems which is faster and more reliable in operation.

The invention contemplates a graphic scanning system which causes the spot of a flying spot scanner to trace a line from an attained position, in increments, in response to a single order specifying the length and direction of a single increment and the number of increments to be executed and a photo detector for examining an image scanned by the spot and for gating the coordinates defining an increment when the gamma of the image lies on a preselected side of a threshold value.

The foregoing and other objects, features and advantages of the invention will be apparent from the following more particular description of a preferred embodiment of the invention as illustrated in the accompanying drawings.

Figure 2:
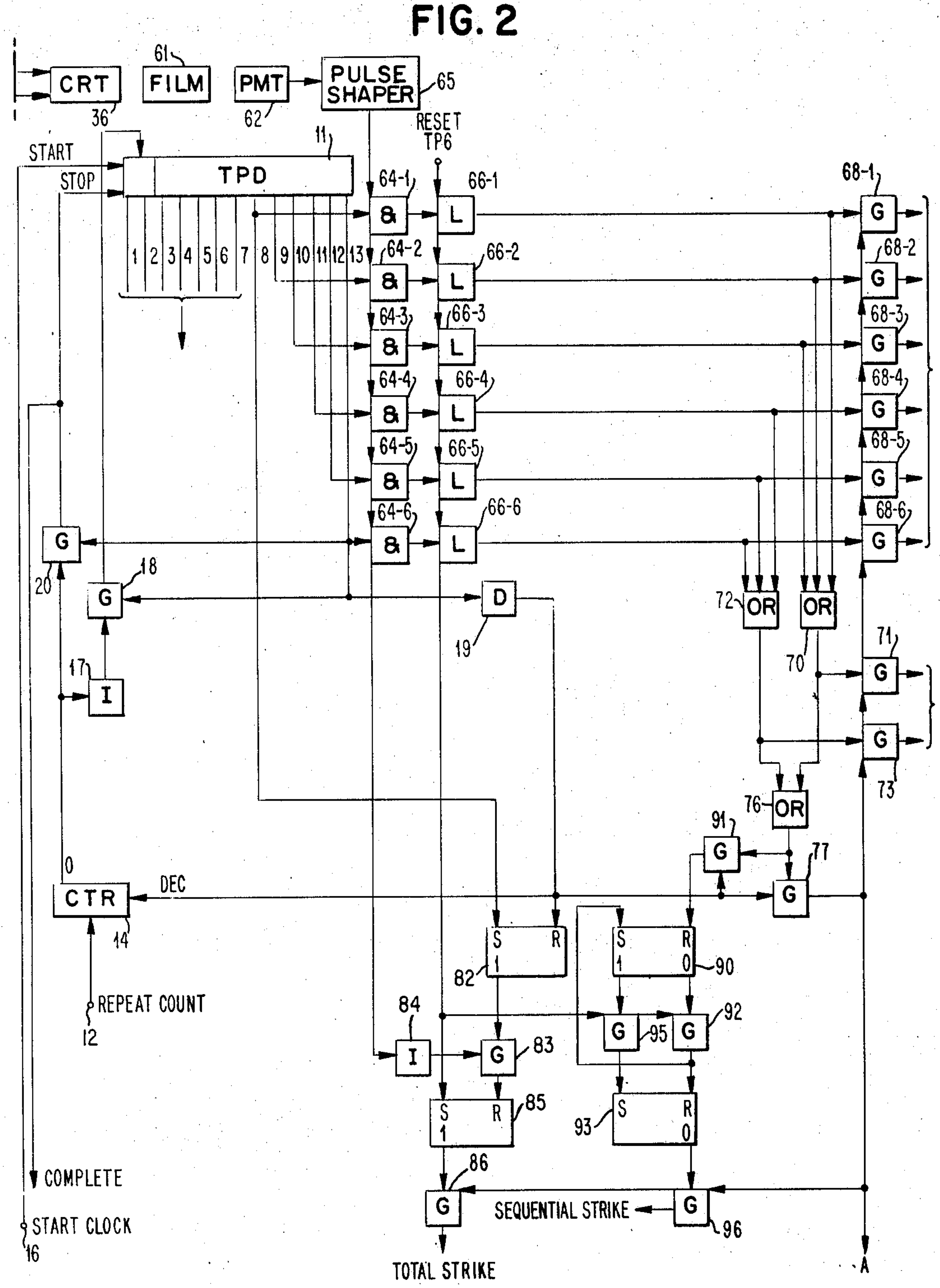

FIGURES 1 and 2 together constitute a block diagram of a novel graphic scanning system constructed according to the invention.

In the drawing a timing pulse distributor 11 provides thirteen timed outputs. These outputs control the gating throughout the circuit. Pulses 1 and 2 are generated once during each cycle of operation while pulses 3–13, inclusive, will be generated a variable number of times as called for by the computer or other control device. In the disclosed embodiment the computer supplies a repeat count on a terminal 12, which is used to set a counter 14. The computer also supplies a start clock signal on a terminal 16 which is applied to timing pulse distributer 11. The zero output of counter 14 is inverted by an inverter 17 and applied to condition a gate 18 which applies the 13th pulse to the third stage of the distributor 11. Counter 14 is decremented by timing pulse 13 delayed via a delay circuit 19, therefore, the minor cycle (3–13) will repeat until the counter reaches zero and once more thereafter. On the 13th time pulse of the minor cycle following the counter 14 reaching zero, the timing pulse distributor is stopped since the zero output of counter 14 conditions gate 20 which passes that 13th timing pulse to stop distributor 11. The repeat count from the computer must be one less in binary code than the actual repeat desired since the circuit will execute one more cycle after the counter reaches zero. This arrangement was selected since it reduces the size of the counter required, that is three binary bits permit a repeat count of up to 8 since the counter is reduced to zero by delay circuit 19 after the last minor cycle is started and the distributor is stopped after the last minor cycle is completed.

The computer in addition to the repeat count which is applied to counter 14 and the start clock signal which is applied to terminal 16 supplies to terminals 22 and 23, respectively, the incremental quantities in the X and Y direction which control the beam movement. Terminal 22 is connected to a register 24 by a gate 26 which is opened on timing pulse 1. Thus, the incremental quantity in the X direction, hereinafter referred to as $\Delta X$ is inserted in register 24. Terminal 23 is connected to a register 28 by a gate 30 which is opened on timing pulse 2, whereby, the incremental quantity in the Y direction, $\Delta Y$, is inserted in register 28. This portion of the timing cycle, i.e. timing pulses 1 and 2, will be executed only once for each order from the computer. Timing pulses 3–13, inclusive, on the other hand will be executed one more time than the binary count supplied at terminal 12. It should be noted here that if only one segment or vector is to be drawn the binary repeat count supplied to terminal 12 will be zero.

A pair of registers 32 and 34 contain the X and Y coordinates, respectively, of the current beam position of the cathode ray tube 36. Both are digital registers and have their outputs connected to the tube deflection circuits 38 by digital to analog converters 40 and 41, respectively. The values stored in registers 32 and 34 may be inserted manually initially or may represent the last attained position of the beam. For the purpose of this description, the manner in which these registers are initially loaded is immaterial and need not be considered further.

A pair of gates 44 and 45 are operated by timing pulse 3 causing the $\Delta X$ stored in register 24 and the current X coordinate of the beam stored in register 32 to be inserted in adder/subtractor 46 where the algebraic sum is formed. This sum is transferred to an X buffer 47 via a pair of gates 48 and 49 under the control of timing pulse 4. Timing pulse 4 is applied to gate 48 via an OR gate 50 and directly to gate 49. At this point, X buffer 47 contains the X coordinate of the end point of the first deflection or vector to be executed by the order received.

Another pair of gates 52 and 53 are operated by timing pulse 5 and cause the $\Delta Y$ quantity stored in register 28 and the current Y coordinate of the beam stored in register 34 to be inserted in adder/subtractor 46 where the algebraic sum is formed. This sum is transferred to a Y buffer 56 via gate 48 under the control of timing pulse 6 which is applied to gate 48 via OR gate 50. At this point the Y buffer 56 contains the Y coordinate of the end point of the first deflection or vector to be executed by the order previously received.

Buffers 47 and 56 are connected to registers 32 and 34 by gates 58 and 59, respectively, and the contents of the buffers are transferred to the respective registers upon the occurrence of timing pulse 7 which controls gates 58 and 59. As soon as the contents are transferred the beam is deflected to the new coordinate position, thus, tracing a vector on the face of the tube 36.

The vector thus traced illuminates and scans a film 61 positioned adjacent the face of tube 36. A photomultiplier tube 62 detects the gamma of the image recorded on film 61 with respect to a fixed threshold value. That is, if the light impinging on the surface of the film is transmitted with an intensity above the threshold of the photomultiplier tube 62, the tube will indicate this state by changing its output. If, on the other hand, the light transmitted is below the threshold of tube 62 the output will remain down and unchanged. If film 61 is a positive image, light will be transmitted when the beam coincides with the image and no transmission will occur when the beam is not in alignment with the image.

Timing pulse distributor 11 provides 13 usable time indicias in sequence. These have been labeled $TP_1$–$TP_{13}$ in the drawing. While these pulses arrive in the sequence set forth they need not necessarily have a fixed time difference between pulses and sufficient time is provided to perform the functions necessary. Timing pulses 8–13, inclusive, occur while the vector (the deflection) is generated. These pulses are applied in sequence to AND gates 64–1 to 64–6, respectively, and sample the gates in time sequence.

The output of tube 62 is passed through a pulse shaping circuit 65 and applied to the other inputs of gates 64 where it is sampled by timing pulses 8–13. A plurality of latches 66–1 to 66–6 are reset at timing pulse 6 and connected for setting to gates 64–1 to 64–6, respectively. Thus, if a strike occurs (a strike being a change in the output of tube 62 due to the transmission of light from the spot through the film above the threshold of tube 62) during any timing pulse the latch 66 associated with that pulse will be set. Latches 66–1 to 66–6 are connected to condition gates 68–1 to 68–6, respectively. Latches 66–1 to 66–3 are connected to an OR circuit 70, the output of which conditions a gate 71 and latches 66–4 to 66–6 are connected to an OR circuit 72, the output of which conditions a gate 73. Gate 71 is conditioned if a strike occurs in the first half of the vector and gate 73 is conditioned if a strike occurs in the second half. If no strike occurs, none of gates 68–1 through 68–6, 71 or 73 will be conditioned.

The outputs of OR circuits 70 and 72 are also connected via an OR circuit 76 to condition another gate 77. The delayed timing pulse 13 is connected via gate 77 to gates 73, 71 and 68–1 to 68–6 and passes through those gates which have been previously conditioned. With this arrangement strike information is gated only when a strike occurs in at least the first or second half of the vector. If a strike has occurred in either half, the output of gate 77 is utilized to gate the contents of registers 32 and 34 via gates 80 and 81, respectively, back to the computer along with the detailed strike information available at gates 68–1 to 68–6, 71 and 73.

Two additional pieces of information about the response from tube 62 are provided by the system. These are total strike information, i.e. was the vector in total coincidence with a transparent or opaque area whichever the case may be, and sequential strike information, i.e. did the previous vector result in a strike. The implementation of these two functions will now be described.

Timing pulse 8 is applied to the set input of a latch 82 which is reset by delayed timing pulse 13 from delay circuit 19. Thus, the "one" output of latch 82 is up from timing pulse 8 to timing pulse 13 delayed. This output conditions a gate 83 which has its other input connected to circuit 65 via an inverter 84. The output of gate 83 is connected to the reset input of a latch 85 which is set at time 6 by timing pulse 6. Thus, the condition of latch 85 indicates the total strike condition, that is, if the strike is continuous, latch 85 will remain set at time 13 delayed and this condition will be transmitted to the computer via a gate 86 at time 13 delayed if a strike has occurred during either the first or second half as indicated by the output of gate 77 which is utilized to perform this gating function since it performs this function for all information. However, if a strike is not total, the output of circuit 65 will fall causing inverter 84 via gate 83 to reset latch 85 thus indicating a lack of the total strike condition.

The circuit portion for developing a sequential strike signal includes a latch 90 with its reset input connected to timing pulse 13 delayed, via a gate 91 which is enabled by OR circuit 76. The "zero" output of latch 90 enables a gate 92 which passes timing pulse 6 to the reset input of another latch 93. The "one" output of latch 90 enables a gate 95 which passes timing pulse 6 to the set input of latch 93. The output of gate 92 is fed back to the set input of latch 90.

At the start of any vector, latch 90 is set and latch 93 will be reset if a strike occurred on the previous vector and set if the previous vector did not result in a strike. If latch 93 is reset, a strike in either the first or second half will cause latch 90 to reset with no further action and the "zero" output of latch 93 which is reset enables a gate 96 which passes timing pulse 13 delayed, to indicate a sequential strike. If on the other hand no strike resulted, latch 90 would remain set and on the next timing cycle timing pulse 6 will set latch 93 to decondition gate 96. This gate cannot be conditioned again until the next timing pulse cycle following a strike. Therefore, gate 96 is always deconditioned on the next strike following a no strike, to prevent gating of timing pulse 13 delayed, to thus indicate a non-sequential condition and gate 96 is always enabled on the next cycle following a strike.

During timing pulse 13 the first vector is completed and timing pulse 13 as previously described if fed back through gate 18 if counter 14 is not zero to cause another increment of X and Y to be algebraically added to the present value of X and Y in registers 32 and 34, respectively. The process is identical to that set forth above for the first vector. Since the counter 14 is decremented by timing pulse 13 delayed and gates 18 and 20 are controlled by timing pulse 13 the device will generate one additional vector after counter 14 is reduced to zero. This result from the fact that the feed back path to rerun the 8–13 cycle of distributor 11 is completed before the count is reduced to zero and the next following timing pulse 13 will pass through gate 20 to stop distributor 11 and signal the computer for the next series of vectors.

The advantages resulting from the novel arrangement should be apparent from the above description. The computer need only specify a single set of relative X and Y coordinates ($\Delta X$ and $\Delta Y$) and a repeat count to generate a large number of short vectors, thus resulting in a substantial reduction in the amount of storage space required. In addition, storage of strike information is substantially reduced since only upon the occurrence of a strike (which incidentally only occurs 10% of the time) is data sent back. The data sent back includes the X and Y coordinates of the strike, which are not available in memory, as well as where the strike occurred within the vector, whether it was total, and if it was sequential. Armed with this information the computer with its program can digitize the image with a minimum of storage and effort.

While the invention has been particularly shown and described with reference to a preferred embodiment thereof, if will be understood by those skilled in the art that various changes in form and detail may be made therein without departing from the spirit and scope of the invention.

What is claimed is:

1. A graphic scanning system comprising, deflection circuit means for generating a flying spot scan upon a digital command for illuminating an image, photosensitive means for examining the image scanned by the spot and supplying signals indicative of the gamma of the image with respect to a predetermined threshold value in the area scanned by the spot, digital means for interpolating the location of said spot within said scan at the time of said indicative signals, said digital means comprising clock means operative to establish a preset sequence of discrete time periods which is coincident with said scan, and output gate means responsive to said photosensitive means and to said digital means for selectively gating the spot position from said deflection means and from said digital means to a utilization device if the gamma lies on one side of the threshold value during any said discrete time period.

2. A system in accordance with claim 1, including logical means for grouping output signals according to subsequences of said time periods, whereby coarse position information is available to a utilization device.

3. A system in accordance with claim 1, including logical means for storing output information during one time period sequence for comparison with output information during a subsequent time period sequence.

4. A graphic scanning system comprising first register means for receiving and storing signals representing incremental distances in the (X) and (Y) directions of a rectangular coordinate system, counter means for receiving and storing a signal representative of the number of times (N) said incremental (X) and (Y) distances are to be generated, a flying spot scanning device, second register means for storing the (X) and (Y) coordinates of the current spot position and for controlling the spot position as a function of the stored (X) and (Y) values, computing means responsive to said first, second and counter means for cumulatively adding in (N) time sequences the incremental distances in (X) and (Y) stored in the first register means to the (X) and (Y) values, respectively, stored in the second register means whereby said spot is caused to move (N) incremental distances, and means including a detector for examining an image scanned by the spot and for gating the (X) and (Y) values stored in the second register means to a utilization device whenever the gamma of the image in the area being scanned during a said time sequence lies on one side of a predetermined threshold value, said last means further comprising clock means and gate means responsive thereto for routing output signals of the detector to lines individual to subdivisions of said time sequence.

5. A system in accordance with claim 4, including logical means for grouping output signals according to subsequences of said subdivisions, whereby coarse position information is available to a utilization device.

6. A system in accordance with claim 4, including logical means for storing output information during one time sequence for comparison with output information during a subsequent time sequence.

7. A system in accordance with claim 4, including total strike indicator means comprising logical means connected to sense continuity in output of said detector during said time sequence.

References Cited

UNITED STATES PATENTS

| | | | |
|---|---|---|---|
| 3,015,730 | 1/1962 | Johnson | 250—217 X |
| 3,340,359 | 9/1967 | Fredkin | 178—6.8 X |
| 3,344,231 | 9/1967 | Dodd et al. | 178—6.8 X |
| 3,050,581 | 8/1962 | Bomba et al. | 250—202 X |

OTHER REFERENCES

American Data Processing, Data Processing Systems Encyc., September 1965, pp. C235.1–.3.

MAYNARD R. WILBUR, Primary Examiner

M. K. WOLENSKY, Assistant Examiner

U.S. Cl. X.R.

178—6.8; 235—61.6; 250—217